United States Patent
Bagri et al.

(10) Patent No.: US 12,024,424 B2
(45) Date of Patent: Jul. 2, 2024

(54) METHOD FOR ELECTROCHEMICAL TRANSFORMATION OF AMORPHOUS MATERIAL TO CRYSTALLINE MATERIAL

(71) Applicant: UT-Battelle, LLC, Oak Ridge, TN (US)

(72) Inventors: Prashant Bagri, Hillsboro, OR (US); Sheng Dai, Knoxville, TN (US); Huimin Luo, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 1193 days.

(21) Appl. No.: 16/774,684

(22) Filed: Jan. 28, 2020

(65) Prior Publication Data

US 2021/0229997 A1 Jul. 29, 2021

(51) Int. Cl.
*C01B 21/064* (2006.01)
*C01F 5/32* (2006.01)

(52) U.S. Cl.
CPC .............. *C01B 21/064* (2013.01); *C01F 5/32* (2013.01); *C01P 2002/02* (2013.01); *C01P 2002/74* (2013.01); *C01P 2004/03* (2013.01); *C01P 2004/04* (2013.01)

(58) Field of Classification Search
None
See application file for complete search history.

(56) References Cited

U.S. PATENT DOCUMENTS

| | | | |
|---|---|---|---|
| 5,053,365 A | * | 10/1991 | Shore .................... C01B 21/064 423/276 |
| 7,205,073 B2 | | 4/2007 | Kim et al. |
| 7,425,388 B2 | | 9/2008 | Park et al. |
| 8,252,438 B2 | | 8/2012 | Han et al. |

(Continued)

OTHER PUBLICATIONS

Chen, H. et al., "Construction of a Nanoporous Highly Crystalline Hexagonal Boron Nitride from an Amorphous Precursor for Catalytic Dehydrogenation", Angew. Chem. Int. Ed., vol. 58, pp. 10626-10630 (2019).

(Continued)

*Primary Examiner* — Guinever S Gregorio
(74) *Attorney, Agent, or Firm* — Scully, Scott, Murphy & Presser, P.C.

(57) ABSTRACT

A method for converting amorphous boron nitride to crystalline boron nitride, the method comprising immersing the amorphous boron nitride into anhydrous molten magnesium chloride maintained within a temperature range of 720° C.-820° C. while the amorphous boron nitride is cathodically polarized at a voltage within a range of −2.2V to −2.8V for a period of time of at least 2 minutes to result in conversion of the amorphous boron nitride to the crystalline form. Also described herein is a method for converting an amorphous carbon material to a crystalline carbon material, the method comprising immersing said amorphous carbon material into anhydrous molten magnesium chloride maintained within a temperature range of 780° C.-820° C. while the amorphous carbon material is cathodically polarized at a (Continued)

voltage within a range of −2.2V to −2.8V for a period of time of at least 2 minutes to result in conversion of the amorphous carbon material to the crystalline form.

9 Claims, 7 Drawing Sheets

(56) References Cited

U.S. PATENT DOCUMENTS 8,287,715 B2 * 10/2012 Taylor .................. C01B 35/023
205/410

OTHER PUBLICATIONS

Ding, F. et al., "Enhanced Performance of graphite anode materials by AIF3 coating for lithium-ion batteries", J. Mater. Chem., vol. 22, pp. 12745-12751 (2012).

Feng, Z. et al., "Hot deformation and the processing map of Zr-1.0BE alloy in a single a phase", Progress in Natural Science: Materials International, vol. 25, pp. 496-502 (2015).

Franklin, R.E., "Crystallite growth in graphitizing and non-graphitizing carbons", Royal Society, pp. 196-218, (1951).

Guo, B. et al., "Soft-Templated Mesoporous Carbon-Carbon Nanotube Composites for High Performance Lithium-ion Batteries", Advanced Materials, vol. 23, pp. 4661-4666 (2011).

Ma, M. et al., "Extraction of titanium from different titania precursors by the FFC Cambridge process", Journal of Alloys and Compounds, vol. 420, pp. 37-45 (2006).

Okabe, T.H. et al., "Metallothermic reduction as an electronically mediated reaction", Journal of Materials Research, vol. 13, No. 12, pp. 3372-3377 (Dec. 1998).

Peng, J. et al., "Electrochemically Driven Transformation of Amorphorous Carbons to Crystalline Graphite Nanoflakes: A Facile and Mild Graphitization Method", Angew. Chem., vol. 129, pp. 1777-1781 (2017).

* cited by examiner

METHOD FOR ELECTROCHEMICAL TRANSFORMATION OF AMORPHOUS MATERIAL TO CRYSTALLINE MATERIAL

This invention was made with government support under Prime Contract No. DE-AC05-00OR22725 awarded by the U.S. Department of Energy. The government has certain rights in the invention.

FIELD OF THE INVENTION

The present invention generally relates to methods for converting an amorphous material (e.g., amorphous carbon or boron nitride) to corresponding crystalline versions of such materials, such as converting amorphous carbon to graphite or converting amorphous boron nitride to hexagonal boron nitride. The present invention more particularly relates to electrochemical methods for converting such materials.

BACKGROUND OF THE INVENTION

Graphite is increasingly considered to be an important material for energy storage. The conventional transformation of amorphous carbon to highly ordered graphitic structures is well known to be a very energy intensive process. This conversion has been traditionally achieved by heating the amorphous carbon to temperatures approaching 3300K with total synthesis time approaching 3 to 4 weeks (e.g., H. Pierson, Handbook of carbon, graphite, diamonds and fullerenes: Properties, processing and applications, Noyes Publications: Park Ridge, New Jersey, 1993; and M. Inagaki, F. Kang, Materials Science and Engineering of Carbon: Fundamentals, $2^{nd}$ Ed., Butterworth-Heinemann, Hardcover ISBN: 9780128008584, 2014).

Moreover, only a select subset of carbons known as graphitizable (i.e., soft) carbons are capable of being converted to graphite. Non-graphitizable (i.e., hard) carbons cannot readily be converted to graphite using the conventional thermal process (e.g., R. E. Franklin, Crystallite growth in graphitizing and non-graphitizing carbons, *Proceedings of the Royal Society of London. Series A. Mathematical and Physical Sciences* 209 (1951) 196-218). It is possible to achieve graphitization at relatively lower temperatures of between 1300 K to 1600 K using transition metal catalysts. However, use of such catalysts is impractical for large scale production. Further, it is very hard to remove all the metal impurities from the graphite (e.g. W. Lian, et al., *Carbon* 46 (2008) 525-530).

Boron nitride, in its disordered form, like carbon, can be categorized into soft and hard forms with respect to the ease with which it can be crystallized. The soft forms can be crystallized by heat treatment, whereas the hard forms are resistant to crystallization and remain disordered. Hexagonal boron nitride (h-BN) is a promising material for a number of applications, particularly since it is known to have excellent thermal and optical properties (e.g., C. Tan et al., Chem. Rev., 117, 6225-6331, 2017). Such properties make h-BN particularly suitable for applications in energy storage. Moreover, the properties of h-BN can vary depending on such characteristics as size, surface area, and crystal defects (e.g., W. Zhu et al., *Nat. Commun.* 8, 15291, 2017). h-BN is regarded as a graphene analog and commonly referred to as 'white graphene.' h-BN is reported to have a layered honeycomb-like structure containing alternating B and N atoms.

The synthesis and transformation of amorphous BN to h-BN nanosheets is known to be very challenging, requiring temperatures as high as 2000° C. (e.g., T. Hagio et al., *Journal of Material Science Letters*, 16, 795-798, 1997; T. Hagio et al., *Journal of Material Science Letters*, 13, 653-655, 1994). The transformation of amorphous BN to h-BN has also been achieved by a strategy using molten metal (e.g., Mg) at lower temperatures (H. Chen et al., *Angew. Chem. Intl. Ed.* 58, 10626-10630, 2019). However, the molten metal flux approach requires stringent and potentially dangerous conditions, and can also introduce potential impurities. The metal flux approach also does not provide the ability to control the reaction and achieve the desired degree of crystallization. Thus, a method that could convert amorphous carbon or boron nitride to their respective crystalline forms at substantially lower temperature and without the use of a molten metal would represent a significant advance in the art.

SUMMARY OF THE INVENTION

The present disclosure describes a method for converting amorphous carbon or boron nitride to their respective crystalline forms by a straight-forward electrochemical approach that precludes the use of molten Mg metal and the safety hazards associated with it. The method more particularly involves the electrochemical transformation of such amorphous materials by employing molten $MgCl_2$ at substantially lower temperatures than conventional processes (e.g., 720° C.-820° C., or, for example, at or up to 1083K) and over generally shorter time periods. Additionally, the battery performance of the electrochemically graphitized carbon (EGC), as produced by the method described herein, is herein below shown to be significantly superior to other graphite materials at high charge-discharge rates. This makes EGC potentially optimal for high rate applications, such as electric vehicles.

In one aspect, the present disclosure is particularly directed to a method for converting amorphous boron nitride to crystalline boron nitride, wherein the method includes: immersing the amorphous boron nitride into anhydrous molten magnesium chloride maintained within a temperature range of 720° C.-820° C. while the amorphous boron nitride is cathodically polarized at a voltage within a range of −2.2V to −2.8V for a sufficient period of time of (e.g., at least 2 minutes) to result in conversion of the amorphous boron nitride to the crystalline boron nitride.

In another aspect, the present disclosure is particularly directed to a method for converting an amorphous carbon material to a crystalline carbon material, wherein the method includes: immersing the amorphous carbon material into anhydrous molten magnesium chloride maintained within a temperature range of 780° C.-820° C. while the amorphous carbon material is cathodically polarized at a voltage within a range of −2.2V to −2.8V for a sufficient period of time of (e.g., at least 2 minutes) to result in conversion of the amorphous carbon material to the crystalline carbon material. The present disclosure is also directed to the resulting crystalline boron nitride and graphite materials produced by the foregoing methods, wherein the resulting crystalline materials have been unexpectedly found to possess unique physical features distinct from other respective crystalline materials produced by other means, e.g., a missing crystalline peak at 44° in the x-ray diffraction (XRD) spectrum and partial retention of properties associated with hard carbon or boron nitride.

BRIEF DESCRIPTION OF THE DRAWINGS

FIGS. 1A-1D compare properties of amorphous boron nitride (BN) with crystalline BN (h-BN) produced by the process described herein using molten MgCl$_2$.

FIGS. 2A-2C compare properties of amorphous hard carbon with crystalline (graphite) carbon (EGC) produced by the process described herein using molten MgCl$_2$. FIG. 2B is a TEM image of EGC showing a layered structure characteristic of graphite. FIG. 2C is a SEM image of EGC showing flakes of graphite.

FIGS. 3A-3B show the lithium-ion battery properties of the EGC produced by the process described herein using molten MgCl$_2$.

DETAILED DESCRIPTION OF THE INVENTION

The present disclosure is foremost directed to a method for converting amorphous carbon or boron nitride to crystalline carbon (e.g., graphite) or crystalline boron nitride (hexagonal boron nitride). In the method, the amorphous carbon or boron nitride (typically in the form of a one or more pellets or a powder) is immersed in anhydrous molten magnesium chloride (MgCl$_2$) maintained within a temperature range of 720° C.-820° C. while the amorphous carbon or boron nitride is cathodically polarized at a voltage within a range of −2.2V to −2.8V for a sufficient period of time of (e.g., at least 2 minutes) to result in conversion of the amorphous carbon or boron nitride to the crystalline form. The term "immersed," as used herein, indicates that the amorphous material is completely submerged in and in contact with the molten magnesium chloride.

The phrase "maintained within a temperature range" may, in a first embodiment, mean maintaining the anhydrous molten magnesium chloride at a particular (i.e., single) temperature within the specified temperature range during the period of time the amorphous material is cathodically polarized and immersed in the molten magnesium chloride. In a second embodiment, the phrase "maintained within a temperature range" permits a change or fluctuation in temperature to occur in the molten magnesium chloride, provided that the temperature of the molten magnesium chloride remains within the specified temperature range. The change or fluctuation in temperature may be, for example, ±1, 2, 5, or 10° C. from a given selected temperature in the range, provided the varying temperatures remain within the range. The magnesium chloride can be heated by any suitable means known in the art, e.g., by being placed in an electric furnace or by being wrapped in heating tape, while contained in a suitable crucible or other vessel.

In some embodiments, one or more other metal halide or nitrate salts may be admixed with the molten magnesium chloride, provided that the one or more other metal halide or nitrate salts form a eutectic with the magnesium chloride, with the eutectic having a lower melting point than magnesium chloride alone, and with the magnesium chloride present in an amount of at least or more than 50, 60, 70, 80, 90, 95, 98, or 99 wt % of the eutectic (i.e., the one or more other metal salts present in an amount of up to or less than 50, 40, 30, 20, 10, 5, 2, or 1 wt %). The one or more other metal salts may be selected from, for example, lithium chloride, lithium nitrate, gallium chloride, indium chloride, zinc chloride, and zinc nitrate. In other embodiments, the molten magnesium chloride contains solely magnesium chloride. In some embodiments, any one or more other salts described above (or any other salts altogether) may be excluded from the molten magnesium chloride. In other embodiments, one or more metal halides or other metal salts having a melting point above magnesium chloride (e.g., CaCl$_2$ or SrCl$_2$) may be present in an amount of no more than or less than 10, 5, 2, or 1 wt % of the molten magnesium chloride, or such other metal salts may be excluded (i.e., 0 wt %).

In different embodiments, the temperature of the molten magnesium chloride is maintained at a temperature of, for example, 720° C., 730° C., 740° C., 750° C., 760° C., 770° C., 780° C., 790° C., 800° C., 810° C., or 820° C., or a temperature within a range bounded by any two of the foregoing temperatures (e.g., 720° C.-820° C., 750° C.-820° C., 780° C.-820° C., 750° C.-800° C., or 780° C.-800° C.). In different embodiments, the cathodic voltage is −2.2V, −2.3V, −2.4V, −2.5V, −2.6V, −2.7V, or −2.8V, or a cathodic voltage within a range bounded by any two of the foregoing values (e.g., −2.2 to −2.8V or −2.3 to −2.7V). In different embodiments, the period of time that the amorphous material is immersed in the MgCl$_2$ while cathodically polarized is at least or precisely, for example, 2 minutes, 5 minutes, 10 minutes, 20 minutes, 30 minutes, 60 minutes (1 hour), 90 minutes, 2 hours, 3 hours, 4 hours, 5 hours, 6 hours, 12 hours, 15 hours, 18 hours, or 24 hours, or a period of time within a range bounded by any two of the foregoing values.

In a first particular embodiment, the method is directed to converting amorphous boron nitride to crystalline boron nitride. The amorphous boron nitride may be hard (non-graphitizable) or soft (graphitizable). In the method, amorphous boron nitride, typically in the form of one or more solid pieces (e.g., pellets), is immersed into anhydrous molten magnesium chloride maintained within a temperature range of 720° C.-820° C. (or within any temperature sub-range provided earlier above) while the amorphous boron nitride is cathodically polarized at a voltage within a range of −2.2V to −2.8V (or within any voltage sub-range provided earlier above) for a sufficient period of time (e.g., at least 2 minutes, or within any time sub-range provided earlier above) to result in conversion of the amorphous boron nitride to the crystalline (hexagonal) boron nitride. In more particular embodiments, the anhydrous molten magnesium chloride is maintained within a temperature range of 750° C.-820° C. or 750° C.-800° C., and the amorphous boron nitride is cathodically polarized at such voltage for a period of time of at least 60, 90, 120, or 180 minutes.

In a second particular embodiment, the method is directed to converting amorphous carbon material (e.g., carbon black, glassy carbon, or carbon foam) to a crystalline carbon form (e.g., graphite). The amorphous carbon may be hard (non-graphitizable) or soft (graphitizable). In the method, amorphous carbon, typically in the form of one or more solid pieces (e.g., pellets), is immersed into anhydrous molten magnesium chloride maintained within a temperature range of 780° C.-820° C. (or within any temperature sub-range provided earlier above) while the amorphous carbon is cathodically polarized at a voltage within a range of −2.2V to −2.8V (or within any voltage sub-range provided earlier above) for a sufficient period of time (e.g., at least 2 minutes, or within any time sub-range provided earlier above) to result in conversion of the amorphous carbon to the crystalline carbon form. In more particular embodiments, the anhydrous molten magnesium chloride is maintained within a temperature range of 790° C.-820° C. or 800° C.-820° C., and the amorphous carbon is cathodically polarized at such voltage for a period of time of at least 60, 90, 120, or 180 minutes.

The amorphous material, while immersed in the molten magnesium chloride, needs to be in direct or indirect contact with a working cathode in order for the amorphous material to be cathodically polarized. The amorphous material can be in contact directly with the cathode itself or may be in contact with one or more conductive wires or plates in contact with the cathode. In particular embodiments, the amorphous material is wrapped within and in contact with a conductive metal (metallic) mesh serving as the cathodic working electrode (i.e., itself the cathode or in contact with the cathode). Notably, the metal mesh or other cathodic material should not be reactive with magnesium chloride or any eutectic component (if present). The metal mesh or other cathodic material should also not be reactive with boron nitride or carbon, as appropriate. The metal mesh may be constructed of or include, for example, molybdenum, nickel, copper, zinc, titanium, cobalt, palladium, platinum, or gold. In the process, the cathode is also necessarily in electrical communication with a counter electrode (anode), which may be, for example, glassy carbon rod.

In another aspect, the present disclosure is directed to the resulting crystalline boron nitride and carbon materials produced by the foregoing methods. In some embodiments, the resulting crystalline materials have been unexpectedly found to possess unique physical features distinct from their conventionally produced counterparts, e.g., absence of sharp crystalline peak at about 44° (i.e., 2θ of 44°) in the x-ray diffraction (XRD) spectrum and partial retention of properties associated with hard carbon or boron nitride. The foregoing peak generally represents the presence of a three-dimensional crystallographic coherency in the graphite. This absence of the peak suggests that the graphite still retains some properties of amorphous carbon, as also confirmed by the presence of a plateau at 0.8 V in the first cycle discharge scan. The crystalline material produced by the above-described method generally also exhibits a sharp crystalline peak at about 26° (i.e., 2θ of 26°) in the x-ray diffraction (XRD) spectrum.

In another aspect, the present disclosure is directed to a lithium-ion battery containing a crystalline carbon material (e.g., graphite), as produced above, in at least the anode (negative charge on discharge) or cathode (positive charge on discharge) of the lithium-ion battery. Lithium-ion batteries are well known in the art. The lithium-ion battery may contain any of the components typically found in a lithium ion battery, including positive and negative electrodes (i.e., cathode and anode, respectively), current collecting plates, and a battery shell, such as described in, for example, U.S. Pat. Nos. 8,252,438, 7,205,073, and 7,425,388, the contents of which are incorporated herein by reference in their entirety.

The negative electrode (anode) of the lithium-ion battery may be constructed of any of the suitable compositions well known in the art. In some embodiments, the negative electrode is or includes the crystalline carbon material produced as described above. In other embodiments, the negative electrode contains a conventional anodic material either in place of or in combination (e.g., in admixture) with the crystalline carbon material. The negative electrode may include any of the carbon-containing and/or silicon-containing anode materials well known in the art of lithium-ion batteries. The carbon-containing composition is typically one in which lithium ions can intercalate or embed, such as graphite (e.g., natural or artificial graphite), petroleum coke, carbon fiber (e.g., mesocarbon fibers), carbon (e.g., mesocarbon) microbeads, fullerenes (e.g., carbon nanotubes, i.e., CNTs), and graphene. The silicon-containing composition, which may be used in the absence or presence of a carbon-containing composition in the anode, can be any of the silicon-containing compositions known in the art for use in lithium-ion batteries. Lithium-ion batteries containing a silicon-containing anode may alternatively be referred to as lithium-silicon batteries. The silicon-containing composition may be, for example, in the form of a silicon-carbon (e.g., silicon-graphite, silicon-carbon black, silicon-CNT, or silicon-graphene) composite, silicon microparticles, or silicon nanoparticles, including silicon nanowires. The negative electrode may also be a metal oxide, such as tin dioxide ($SnO_2$) or titanium dioxide ($TiO_2$), or a composite of carbon and a metal oxide. The lithium-ion battery may also be a lithium-sulfur battery, wherein sulfur and/or lithium sulfides may be admixed at the cathode with the crystalline carbon material described above.

The positive electrode (cathode) of the lithium-ion battery may be constructed of any the suitable compositions well known in the art. In some embodiments, the positive electrode is or includes the crystalline carbon material produced as described above. In some embodiments, the cathode includes a conventional cathode material admixed with the crystalline carbon material. The conventional cathode material can be, for example, manganese dioxide ($MnO_2$), iron disulfide ($FeS_2$), copper oxide (CuO), or a lithium metal oxide, wherein the metal is typically a transition metal, such as Co, Fe, Ni, or Mn, or combination thereof. Some examples of lithium metal oxides include $LiCoO_2$, $LiNiCoO_2$, $LiMnO_2$, and $LiFePO_4$. In an effort to increase the energy density of the LIBs, 5.0 V positive electrode materials, such as $LiNi_{0.5}Mn_{1.5}O_4$, $LiNi_xCo_{1-x}PO_4$, and $LiCu_xMn_{2-x}O_4$, have also been developed (Cresce, A. V., et al., *Journal of the Electrochemical Society*, 2011, 158, A337-A342). To improve conductivity at the positive electrode, conductive carbon material (e.g., carbon black, carbon fiber, or graphite) is often admixed with the positive electrode material. In some embodiments, any one or more classes or specific types of conventional cathode materials are excluded from the cathode.

In the lithium-ion battery, the positive and negative electrode compositions are often admixed with an adhesive (e.g., PVDF, PTFE, and co-polymers thereof) in order to gain the proper viscosity and density for molding as electrodes. A conductive substance (e.g., a conductive carbon) may or may not also be included. Typically, positive and negative current collecting substrates (e.g., Cu or Al foil) are also included. The assembly of lithium-ion batteries is well known in the art.

The lithium-ion battery may also include a solid porous membrane positioned between the negative and positive electrodes. The solid porous membrane can be composed of, for example, a plastic or polymeric material (e.g., polyethylene, polypropylene, or copolymer thereof), or an inorganic material, such as a transition metal oxide (e.g., titania, zirconia, yttria, hafnia, or niobia) or main group metal oxide, such as silicon oxide, which can be in the form of glass fiber.

As well known in the art, the lithium-ion battery typically also includes a lithium-containing electrolyte, which contains a lithium salt. The lithium salt can, in one embodiment, be non-carbon-containing (i.e., inorganic) by having an inorganic counteranion. The inorganic counteranion can be, for example, a halide (e.g., chloride, bromide, or iodide), hexachlorophosphate ($PCl_6^-$), hexafluorophosphate ($PF_6^-$), perchlorate, chlorate, chlorite, perbromate, bromate, bromite, periodate, iodate, aluminum fluorides (e.g., $AlF_4^-$), aluminum chlorides (e.g., $Al_2Cl_7^-$ and $AlCl_4^-$), aluminum bromides (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, the borates (e.g., borate, diborate, triborate, tetraborate), tetrafluoroborate, anionic borane clusters (e.g., $B_{10}H_{10}^{2-}$ and $B_{12}H_{12}^{2-}$), perrhenate, permanganate, ruthenate, perruthenate, and the polyoxometalates. The lithium salt can, in another embodiment, be carbon-containing (i.e., organic) by including an organic counteranion. The organic counteranion may, in one embodiment, lack fluorine atoms. The organic counteranion can be, for example, carbonate, the carboxylates (e.g., formate, acetate, propionate, butyrate, valerate, lactate, pyruvate, oxalate, malonate, glutarate, adipate, decanoate, and the like), the sulfonates (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), the alkoxides (e.g., methoxide, ethoxide, isopropoxide, and phenoxide), the amides (e.g., dimethylamide or diisopropylamide), diketonates (e.g., acetylacetonate), the organoborates (e.g., $BR_1R_2R_3R_4^-$, wherein $R_1$, $R_2$, $R_3$, $R_4$ are typically hydrocarbon groups containing 1 to 6 carbon atoms), anionic carborane clusters, alkylsulfates (e.g., diethylsulfate), alkylphosphates (e.g., ethylphosphate or diethylphosphate), dicyanamide (i.e., $N(CN)_2^-$), tricyanamide (i.e., $N(CN)_3^-$), and the phosphinates (e.g., bis-(2,4,4-trimethylpentyl)phosphinate). The organic counteranion may, in another embodiment, include fluorine atoms. For example, the lithium-containing species can be a lithium ion salt of such counteranions as the fluorosulfonates (e.g., $CF_3SO_3^-$, $CF_3CF_2SO_3^-$, $CF_3(CF_2)_2SO_3^-$, $CHF_2CF_2SO_3^-$, and the like), the fluoroalkoxides (e.g., $CF_3O^-$, $CF_3CH_2O^-$, $CF_3CF_2O^-$, and pentafluorophenolate), the fluorocarboxylates (e.g., trifluoroacetate and pentafluoropropionate), and the fluorosulfonylimides (e.g., $(CF_3SO_2)_2N^-$). In some embodiments, any one or more classes or specific types of lithium salts are excluded from the electrolyte. In other embodiments, a combination of two or more lithium salts is included in the electrolyte.

Examples have been set forth below for the purpose of illustration and to describe certain specific embodiments of the invention. However, the scope of this invention is not to be in any way limited by the examples set forth herein.

EXAMPLES

Magnesium Chloride Dehydration

Dehydration of $MgCl_2$, which forms hydrates with up to 12 hydration waters, proceeds with the sequential release of water down to the monohydrate. Upon further heating, the monohydrate hydrolyzes into MgO and HCl (C. Tan et al., *Chem. Rev.*, 117, 6225-6331, 2017). To aid in the dehydration of $MgCl_2$ while preventing hydrolysis, ammonium chloride was herein used. When heated in the presence of hydrated $MgCl_2$, ammonium chloride forms a carnallite intermediate that facilitates the release of water (e.g., Q. Weng et al., *Chem. Soc. Rev.*, 45, 3989-4012, 2016), according to the following equation:

$MgCl_2 \cdot nH_2O + NH_4Cl \rightarrow MgCl_2 + NH_3(g) + HCl(g) + H_2O$

Commercial anhydrous $MgCl_2$ (99.9% purity) was stored in a vacuum oven at 120° C. 500 g of $MgCl_2 \cdot xH_2O$ was weighed and mixed with 250 g of $NH_4Cl$ (99% purity). The mixture was then placed in a 12-inch long quartz crucible with a three-inch inner diameter. The crucible was placed in a quartz reactor equipped with a sealed, removable three-port head. The assembled reactor was placed in a Lindberg Blue tube furnace, and the reactor was purged with ultra high purity argon (i.e., "UHP Ar") for 1 hour. UHP Ar was flowing constantly at 0.5 L/min during the heating and cooling. The salt was heated from room temperature to 400° C. at 20° C./min and held at this temperature for 2 hours. The salt mixture was then heated to 850° C. at 20 C/min for 1 hour to remove excess ammonium chloride and fuse $MgCl_2$. After 1 hour at 850° C. the furnace was turned off and allowed to cool to room temperature. Once cooled, the reactor was kept under UHP Ar and was transferred into a UHP Ar-blanketed glove box. The fused $MgCl_2$ salt was retrieved and broken into smaller pieces. The salt was then stored in Mason jars inside the glove box before being used for the electrochemical experiments.

Synthesis of Boron Nitride (BN)

0.05 mol boric acid and 1.2 mol urea were dissolved in deionized water (200 mL). The homogeneous solution was heated to 60° C. for recrystallization. A white powder was obtained by the subsequent evaporation of water. Then the precursors were heated at 5° C.·$min^{-1}$ to 900° C. and kept for 120 minutes under a nitrogen ($N_2$) atmosphere.

Conversion of Amorphous Boron Nitride to Crystalline Form

The essence of the following strategy lies in the cathodic polarization of amorphous BN in molten $MgCl_2$ at 750° C., which results in the formation of highly ordered, crystalline flakes of h-BN. Furthermore, the versatility of the electrochemical crystallization process is validated by demonstrating the transformation of amorphous hard carbon to graphite with a high degree of graphitization.

The as-prepared amorphous BN was pelletized (0.2 g) and wrapped in molybdenum (Mo) mesh. This BN pellet-Mo mesh assembly was attached to a Mo rod using Mo wires, which served as the working electrode. Glassy carbon rods (6 mm) served as counter electrodes for the electrochemical cell. A glassy carbon crucible containing $MgCl_2$ was placed in a sealed quartz reactor. The quartz reactor was heated using an electric furnace. $MgCl_2$ was dehydrated previously.

After treatment in the molten salt, the processed pellet was crushed and leached in a mild acid (0.1 N HCl) for 24 hours. The product was further washed with deionized water and filtered to remove residual acid. The product was subsequently dried in an oven at 120° C.

Results for Crystallization of Amorphous Boron Nitride

FIGS. 1A-1D show the results of BN crystallization in molten $MgCl_2$ at 750° C. In the X-ray diffraction data shown in FIG. 1A, amorphous BN shows no peaks indicative of a completely amorphous structure. After electrochemical treatment in the molten salt, the diffraction pattern manifests a characteristic peak observed at 2θ=26°, representing the (002) plane, which confirms the transformation to h-BN (H. Chen et al., *Angew. Chem. Int. Ed.* 58, 10626-10630, 2019). The $d_{002}$ value is calculated to be about 3.3 Å, consistent with the literature (H. Chen et al., Ibid.). Another smaller peak is observed at 2θ=40°, representing the (100) and (101) plane. Further, h-BN synthesized at both −2.2 V and −2.6 V show a similar diffraction pattern. However, at higher cathodic potentials, peak intensity is observed to increase, suggesting higher crystallinity being achieved at −2.6 V versus −2.2 V. This is likely a result of higher polarization potentials driving a larger faradic current through the cell, thus driving the crystallization. Finally, BN could not be crystallized in molten $CaCl_2$ even at higher temperatures (920° C.). Although a minor peak is observed near 2θ=40°, the crystallization of BN in molten $CaCl_2$ appears to be very unfavorable. Hence, previously reported processes using molten $CaCl_2$ cannot be used for h-BN crystallization (J. Peng et al., *Angew. Chem. Int. Ed.*, 129, 1777-1781, 2017). The reason for the inability of $CaCl_2$ to drive the crystallization is presently not clear.

Figure 1A:
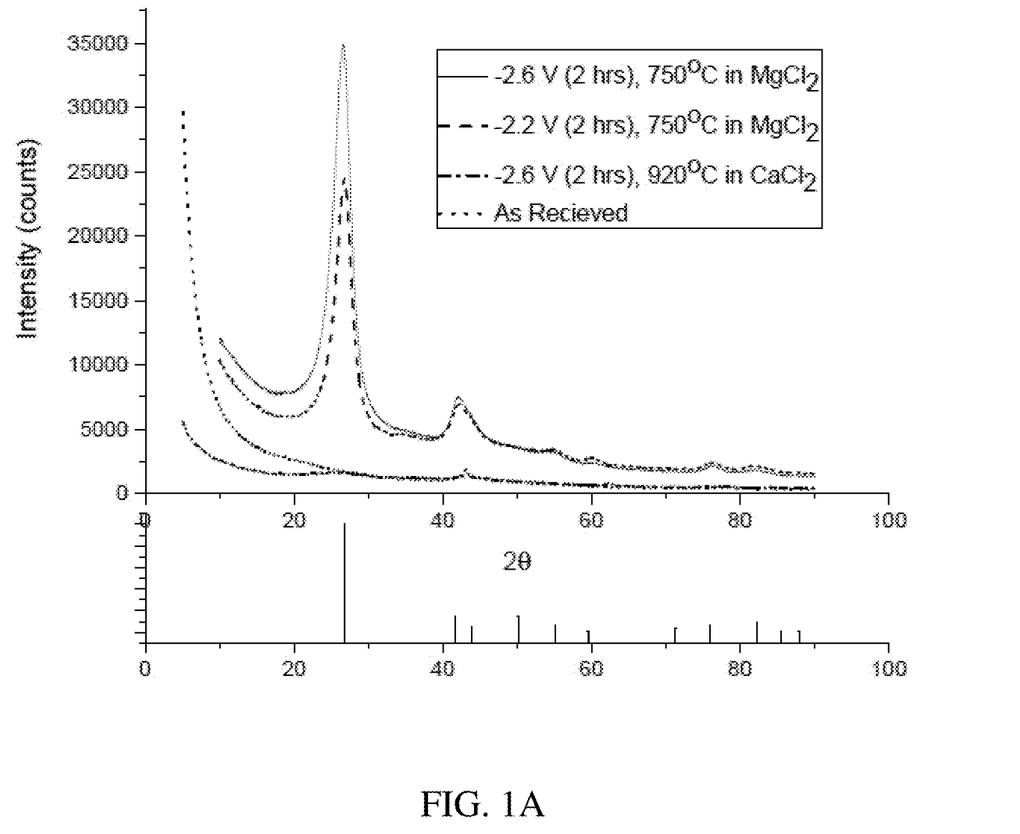
FIG. 1A shows X-ray diffraction spectra of the starting material (amorphous BN) and h-BN.
Figure 1B:
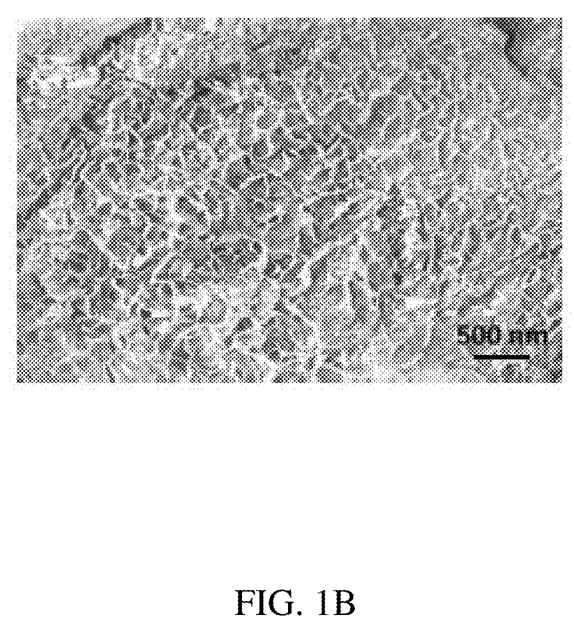
FIGS. 1B and 1C are scanning electron micrograph (SEM) images of the h-BN showing flakes of BN.
Figure 1C:
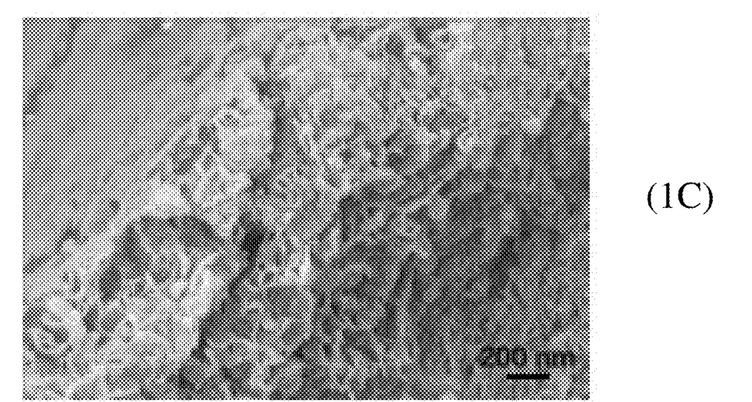
Figure 1D:
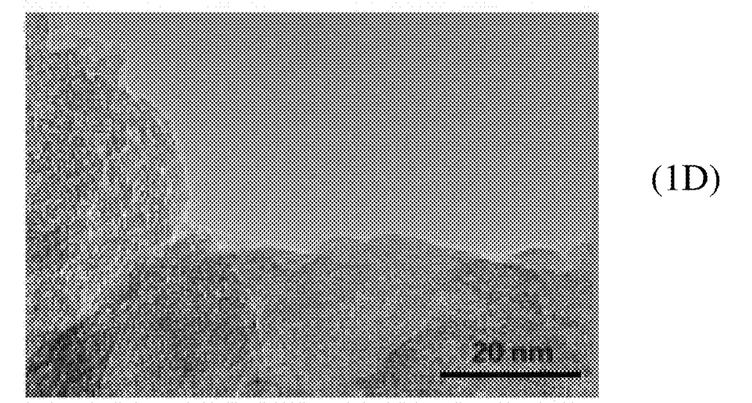
FIG. 1D is a transmission electron micrograph (TEM) image of the h-BN showing an ordered crystal structure.

SEM images of the produced h-BN in FIGS. 1B and 1C show flakes of h-BN indicative of an ordered structure compared to the disordered structure of amorphous BN. Careful analysis of a TEM image of h-BN (FIG. 1D) reveals an ordered, lattice-like structure compared to the disordered, amorphous structure of BN before treatment in the molten salt.

Compared to the previously reported process for the crystallization of h-BN, the electrochemical approach reported here is much simpler and safer. Previously, the synthesis of crystalline h-BN was reported at 900° C. using Mg metal (H. Chen et al., Ibid.) compared to the milder condition at 750° C. achieved in this study. Further, the hazards associated with the handling of molten Mg metal are eliminated using the electrochemical approach described here. Finally, as demonstrated here, it is possible to control the degree of crystallization by fine-tuning the applied voltage. This provides more flexibility and reaction control, which is not possible in the aforementioned process that simply employs Mg metal powder to catalyze the reaction.

Conversion of Amorphous Carbon to Crystalline (Graphite) Form

Figure 2A:
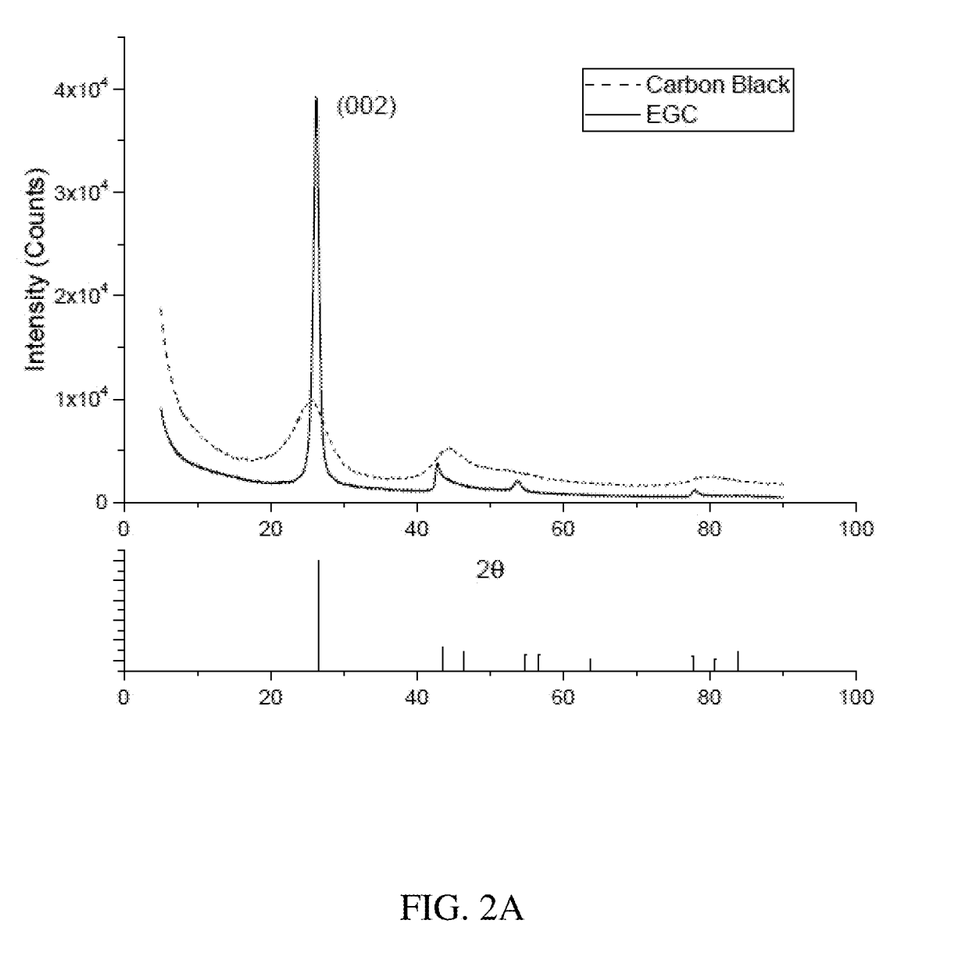
FIG. 2A shows X-ray diffraction spectra of the starting material (hard carbon) and EGC.

The analogous production of graphite from amorphous carbon by use of $MgCl_2$ was also herein investigated. Amorphous carbon electrodes were prepared using the same procedure as described above for converting boron nitride to its crystalline form. The only difference was that conversion of amorphous carbon used nickel (Ni) mesh instead of Mo to wrap the carbon pellet (0.5 g). To validate the versatility of the approach reported herein, amorphous carbon was graphitized at 810° C. Attempts to graphitize amorphous carbon at 750° C. were largely unsuccessful, which suggests a lower bound temperature for the synthesis of graphite. The amorphous carbon was cathodically polarized at −2.6 V for 2 hours. In FIG. 2A, the X-ray diffraction spectrum of amorphous carbon and EGC is shown. Prior to treatment, amorphous carbon exhibits a broad peak indicating the amorphous state. After electrochemical treatment in the molten salt, a sharp, crystalline peak was observed at 2θ=26°, which is characteristic of graphite. This result clearly indicates that molten $MgCl_2$ can be used for the transformation of hard amorphous carbon to graphite.

TEM and SEM images of EGC shown in FIGS. 2B and 2C provide additional evidence of the graphitic morphology of EGC. The TEM image clearly shows the layered structure of the carbon that is characteristic of graphite. Compared to the TEM of hard carbon, EGC shows a massively augmented layered structure. The SEM image shows the flakes of graphite in comparison to the known globular morphology of hard carbon. Holistic analysis of the XRD, SEM, and TEM data indicates that the amorphous hard carbon was successfully transformed into graphite via cathodic polarization in molten $MgCl_2$.

Coin Cell Preparation and Battery Performance of the Produced Graphite

For electrochemically generated graphite (EGCs), their battery performance was investigated in two-electrode coin cells with lithium metal as a counter/reference electrode. The slurry casting method was used to make the electrode. A slurry was prepared by mixing EGC, hard carbon (CB45), and PVDF (poly (vinylidene fluoride)) in a weight ratio of 90:4:6 in N-methyl pyrrolidone (NMP). The slurry was cast on the copper foil using a doctor blade. The loading of EGC was approximately 1.84 mg per $cm^2$, with the electrode area of 1.27 $cm^2$. 1.2 M lithium hexafluorophosphate ($LiPF_6$) in ethylene carbonate (EC)/diethyl carbonate (DEC)/dimethyl carbonate (DMC) in a 1:1:1 ratio by volume was used as electrolyte. Celgard® 2325 was used as a separator between the two electrodes. The coin cells were assembled inside the high purity argon glove box (≤0.5 ppm O2 and ≤0.5 ppm $H_2O$). The galvanostatic charge-discharge cycling was performed between 0.005 V to 3.0 V at room temperature at different current densities (0.1 C, 1C, and 5C, where 1 C=372 mAh $g^{-1}$) to test the feasibility of EGCs as an anode for fast charging battery applications.

Cycling voltammetry (CV) was also conducted to compare the electrochemical properties of EGC with commercially available synthetic graphite. The CV testing corroborates the results of the battery testing. EGC exhibits a first cycle discharge capacity of 685 mAh/g that is greater than that of traditional graphite (372 mAh/h) and hard carbon (418 mAh/g). The CV testing confirms the fact that, in the first cycle, EGC manifests a peak at 0.8 V vs. $Li/Li^+$, which disappears in subsequent cycles. A comparison of the CV for EGC, hard carbon and commercial graphite reveals that EGC has a similar but extended plateau to that of hard carbon, which indicates the porous nature of EGC and which is beneficial for fast lithium diffusion kinetics. From the $2^{nd}$ cycle onwards, the discharge profile of EGC resembles more closely that of commercial graphite rather than that of hard carbon. The CV data confirm that EGC was successfully graphitized, but still retained some of the properties of amorphous carbon, such as porosity and higher surface area, which are beneficial for fast lithium diffusion kinetics (which is desirable for many applications).

Electrochemically Generated Graphite (EGC) as Anode for Lithium-Ion Battery

Figure 3A:
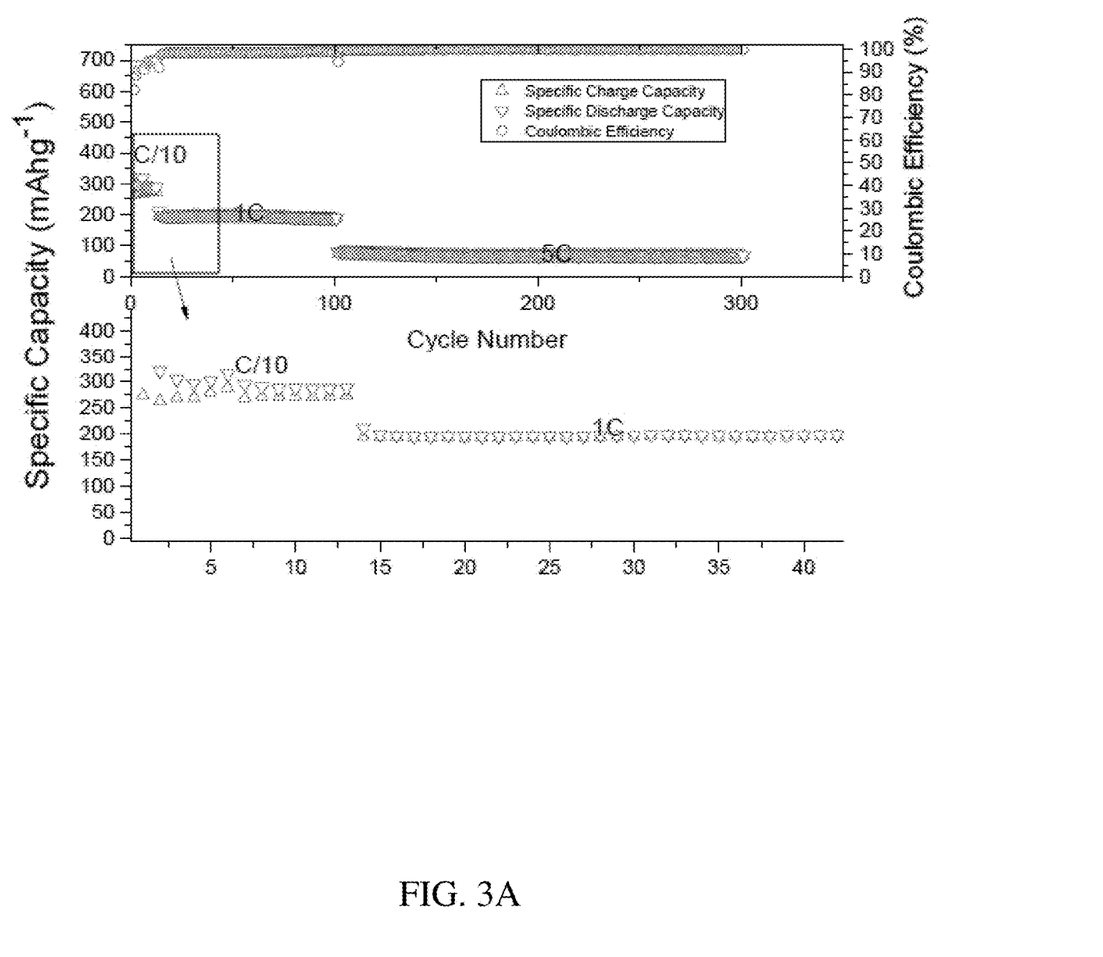
FIG. 3A is a graph showing battery performance of the EGC at 0.1C, 1C, and 5C, wherein the EGC exhibits a capacity of about 70 mAh g$^{-1}$.
Figure 3B:
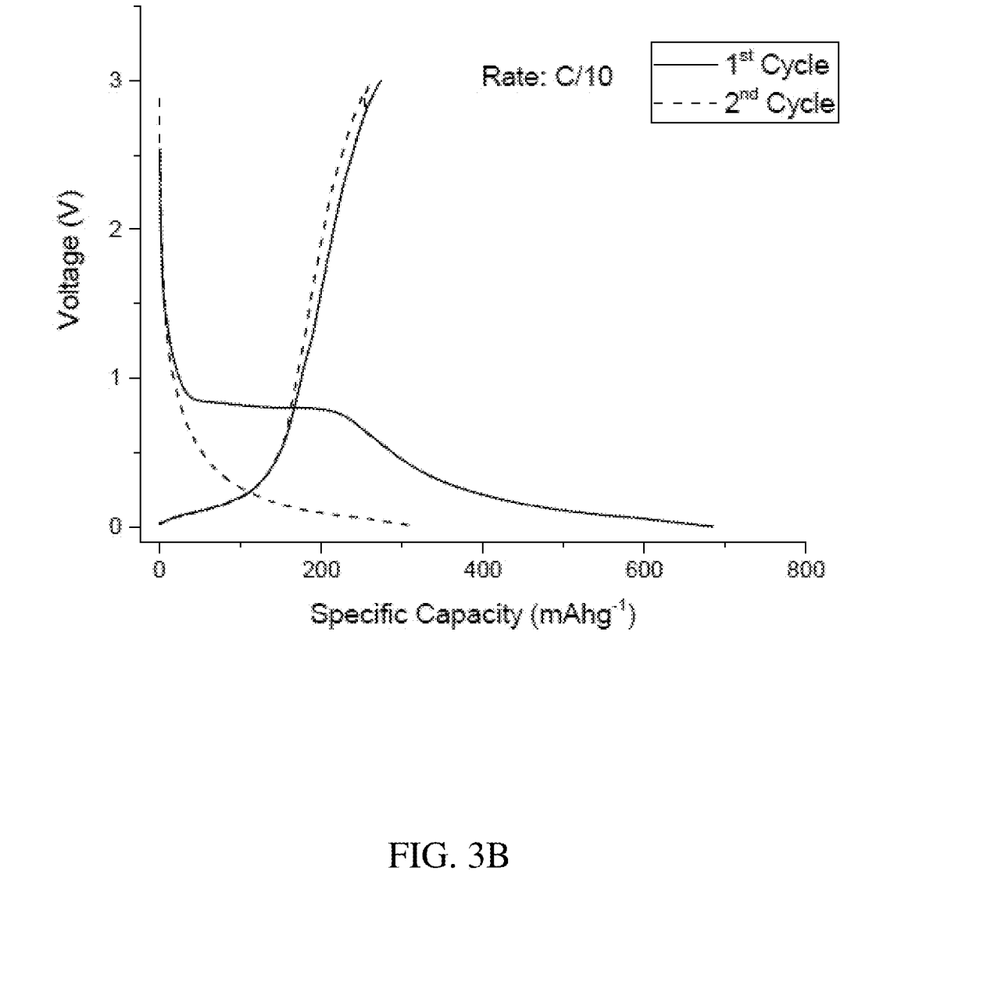
FIG. 3B is a graph showing the charge-discharge profile for EGC, wherein the EGC exhibits a plateau at about 0.8 V vs. Li.

The feasibility of the above-produced EGC as an anode for fast charging battery applications was investigated. The electrochemical performance of EGC is shown in FIGS. 3A and 3B. The coin cells were galvanostatically cycled at three different rates (0.1 C, 1 C, and 5 C) to investigate the electrochemical performance at the high current rate and compare the result with state-of-the-art (conventional) graphite. The EGC produced herein exhibits a first cycle discharge capacity of 685 mAh $g^{-1}$, well above the theoretical capacity (372 mAh $g^{-1}$) and first discharge capacity (348 mAh $g^{-1}$) of graphite and the first discharge capacity (418 mAh $g^{-1}$) of hard carbon. The first-cycle coulombic efficiency for EGC is observed to be 40%, comparable to hard carbon (46%), but lower than traditional graphite (81%). The low first cycle coulombic efficiency is likely due to the formation of the solid electrolyte interphase (SEI). Since the starting material has a high surface area (particle size 50 nm), more of the electrolyte is reacted to the surface, leading to SEI formation (W. Luo et al., *ACS Applied Materials & Interfaces*, 7, 2626-2631, 2015; C. J. Jafta et al., *Energy & Environmental Science*, 12, 1866-1877, 2019). This phenomenon has been well documented in the literature previously (E. Peled et al., *J. Electrochem. Soc.*, 143, L4-L7, 1996; S. S Zhang et al., *Electrochim Acta*, 51, 1636-1640, 2006; and V. A. Agubra et al., *J. Power Sources*, 268, 153-162, 2014). Further, in the first cycle charge-discharge curves, an extended plateau is observed at around 0.8 V vs. $Li/Li^+$ and disappears after subsequent cycles, indicating the formation of SEI takes place only during the first discharge cycle (e.g., J. Liu et al., *Energy Environ. Sci.*, 6, 2691-2697, 2013).

A comparison of the first discharge profile of EGCs with hard carbon and synthetic graphite reveals that EGC has a similar but extended plateau than hard carbon, indicating a porous nature of the EGCs, which is beneficial for fast lithium diffusion kinetics. The first-discharge profile of synthetic graphite reveals a similar voltage plateau around 0.8 V, also indicative of SEI formation, but much smaller than EGCs. From the second cycle onwards, charge-discharge profiles of EGC resembles more graphitic behavior than hard carbon behavior. These results were corroborated by cyclic voltammetry experiments. These results indicate that amorphous carbon was successfully graphitized. However, EGCs are apparently not fully graphitized as EGCs preserve some of the properties of amorphous carbon, such as higher surface area and porosity, as verified by electrochemical data. These hybrid properties, including higher surface area and porosity, are believed to be involved in the resulting fast lithium diffusion kinetics, which result in a high energy density and stable cycling performance.

At 1 C and 5 C, a very stable capacity of about 200 mAh $g^{-1}$ and 70 mAh $g^{-1}$ at 99.9% coulombic efficiency is observed for the EGCs produced herein. This is much higher than the capacity of traditional graphite (25 mAh $g^{-1}$), which is consistent with the literature (B. Guo et al., *Adv. Mater.*, 23, 4661-4666, 2011; F. Ding et al., *J. Mater. Chem.*, 22, 12745-12751, 2012). This much enhanced electrochemical performance of EGCs at higher charge-discharge rates compared to traditional graphite prepared by thermal means is a result of the electrochemically driven process described herein for production of the EGCs. The stable higher capacity at fast charging indicates that EGCs are suitable as an anode material for the fast-charging battery.

While there have been shown and described what are at present considered the preferred embodiments of the invention, those skilled in the art may make various changes and modifications which remain within the scope of the invention defined by the appended claims.

What is claimed is:

1. A method for converting amorphous boron nitride to crystalline boron nitride, the method comprising immersing the amorphous boron nitride into anhydrous molten magnesium chloride maintained within a temperature range of 720° C.-820° C. while the amorphous boron nitride is cathodically polarized at a voltage within a range of −2.2V to −2.8V for a sufficient period of time to result in conversion of the amorphous boron nitride to the crystalline boron nitride.

2. The method of claim 1, wherein the crystalline boron nitride is hexagonal boron nitride.

3. The method of claim 1, wherein the anhydrous molten magnesium chloride is maintained within a temperature range of 750° C.-820° C.

4. The method of claim 1, wherein the anhydrous molten magnesium chloride is maintained within a temperature range of 750° C.-800° C.

5. The method of claim 1, wherein the amorphous boron nitride is cathodically polarized at said voltage for a period of time of at least 1 hour.

6. The method of claim 1, wherein the amorphous boron nitride is cathodically polarized at said voltage for a period of time of at least 90 minutes.

7. The method of claim 1, wherein the amorphous boron nitride is wrapped within and in contact with a metal mesh serving as cathodic working electrode.

8. The method of claim 7, wherein said metal mesh is molybdenum.

9. The method of claim 1, wherein said crystalline boron nitride exhibits an x-ray diffraction peak at 2θ of 26°.

\* \* \* \* \*